(12) United States Patent
Paraiso et al.

(10) Patent No.: US 12,519,548 B2
(45) Date of Patent: Jan. 6, 2026

(54) OPTICAL DEVICE (71) Applicant: Kabushiki Kaisha Toshiba, Tokyo (JP)

(72) Inventors: Taofiq Paraiso, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 331 days.

(21) Appl. No.: 18/162,012

(22) Filed: Jan. 31, 2023

(65) Prior Publication Data

US 2023/0412372 A1 Dec. 21, 2023

(30) Foreign Application Priority Data

Jun. 17, 2022 (GB) .................................... 2208954

(51) Int. Cl.
*H04B 10/00* (2013.01)
*H04B 10/70* (2013.01)
*H04J 14/00* (2006.01)

(52) U.S. Cl.
CPC .................................. *H04B 10/70* (2013.01)

(58) Field of Classification Search
CPC .............. H04B 10/505; H04B 10/5053; H04B 10/548; H04B 10/556; H04B 10/5561; H04B 10/70
See application file for complete search history.

(56) References Cited

U.S. PATENT DOCUMENTS

| | | | |
|---|---|---|---|
| 2005/0254823 A1 | 11/2005 | Beausoleil, Jr. et al. | |
| 2012/0328290 A1* | 12/2012 | Yuan | H04L 9/0855 398/154 |
| 2013/0301094 A1 | 11/2013 | Gilbert et al. | |
| 2017/0019185 A1 | 1/2017 | Agarwal et al. | |

(Continued)

FOREIGN PATENT DOCUMENTS

| | | | |
|---|---|---|---|
| CN | 106375088 A | | 2/2017 |
| CN | 110190953 A | * | 8/2019 |

(Continued)

OTHER PUBLICATIONS

Machine Translation CN110190953A (Year: 2025).*

(Continued)

*Primary Examiner* — Daniel G Dobson
(74) *Attorney, Agent, or Firm* — Oblon, McClelland, Maier & Neustadt, L.L.P.

(57) ABSTRACT

An optical device comprising: a light routing element coupled to a first optical path and a second optical path such that light received by the light routing element is directed into one of the first optical path or the second optical path; a combiner coupling the first optical path and second optical path into a single output path; a controller applying a control signal to said light routing element, the control signal indicating whether a portion of the light received by the light routing element is directed into the first optical path or into the second optical path; a phase controlling element provided in the first optical path such that there is provided a (Continued)

pre-determined fixed phase difference between a light pulse routed through the first optical path and a light pulse routed through the second optical path.

22 Claims, 5 Drawing Sheets

(56) References Cited

U.S. PATENT DOCUMENTS

| | | |
|---|---|---|
| 2018/0062838 A1 | 3/2018 | Godfrey et al. |
| 2019/0260478 A1 | 8/2019 | Lucamarini et al. |

FOREIGN PATENT DOCUMENTS

| | | |
|---|---|---|
| CN | 210839599 U | 6/2020 |
| CN | 215378934 U | 12/2021 |
| CN | 215378935 U | 12/2021 |
| CN | 11 4584224 A | 6/2022 |
| JP | 2001-28584 A | 1/2001 |
| JP | 2007-535711 A | 12/2007 |
| JP | 2015-40959 A | 3/2015 |
| JP | 2016-25550 A | 2/2016 |
| JP | 2018-515046 A | 6/2018 |
| JP | 2019-148794 A | 9/2019 |
| WO | WO 2022/003704 A1 | 1/2022 |

OTHER PUBLICATIONS

Japanese Office Action issued Jul. 2, 2024 in Japanese Application 2023-023722, (with unedited computer-generated English translation), 5 pages.

Office Action issued Apr. 2, 2024, in corresponding Japanese Patent Application No. 2023-023722 (with English Translation), 6 pages.

Combined United Kingdom Office Action and Search Report issued Dec. 14, 2022 in United Kingdom Application No. GB2208954.4, 8 pages.

Winzer et al., "Advanced Optical Modulation Formats", Proceedings of the IEEE, vol. 94, No. 5, May 2006, pp. 952-985.

"Optical Modulation—Advanced Techniques and Applications in Transmission Systems and Networks" Le Nguyen Binh, Ch.1, 2016, pp. 1-22.

Sibson et al., "Chip-based quantum key distribution", Nature Communications, Feb. 9, 2017, pp. 1-6.

Paraiso et al., "A Modulator-free quantum key distribution transmitter chip", NPJ Quantum Information, vol. 5, No. 42, May 23, 2019, pp. 1-6.

Sibson et al.,"Integrated silicon photonics for high-speed quantum key distribution", Optica, vol. 4, No. 2, Feb. 2017, pp. 172-177.

Bunandar et al., "Metropolitan Quantum Key Distribution with Silicon Photonics", Phys. Rev. X 8, 2018, pp. 1-12.

Yin et al., "On-chip Silicon switchable polarization beam splitter", Optics Letters, vol. 47, No. 4, Feb. 15, 2022, pp. 961-964.

Ogawa et al., "Silicon-based phase shifters for high figure of merit in optical modulation", Silicon Photonics XI, vol. 9752, 2016, pp. 1-8.

Melati et al., "Wavelength and composition dependence of the thermos-optic coefficient for InGaAsP-based integrated waveguides", Journal of Applied Physics, vol. 120, 2016, pp. 1-9.

Unknown, "Lecture 4: Optical waveguides", retrieved from: http://www-eng.lbl.gov/~shuman/NEXT/CURRENT_DESIGN/TP/FO/Lect4-Optical%20waveguides.pdf, Feb. 7, 2013, pp. 1-93.

Selvaraja et al., "Review on Optical Waveguides", Emerging Waveguide Technology, Ch.6, 2018, pp. 95-129 (total 27 pages).

Meng et al., "Optical meta-waveguides for integrated photonics and beyond", Light: Science & Applications, vol. 10, 2021, pp. 1-44.

Wang et al, "A Quantum Private Comparison Protocol with Splitting Information Carriers", Journal of Theoretical Physics, vol. 54, No. 1, 2014, pp. 281-291.

\* cited by examiner

OPTICAL DEVICE

FIELD OF INVENTION

Embodiments described herein relates to an optical device for phase-encoding a quantum state.

BACKGROUND

In a quantum communication system, information is encoded into quantum bits, or qubits, which are then sent by a transmitter to a receiver. Qubits can be encoded by means of quantum states of a chosen basis of a single quantum, such as a photon. A quantum state can be formed by using properties of the photon to define pure quantum states, and varying the phase relationship between the pure quantum states to form a chosen state of a basis.

Quantum encoded states have practical application in quantum cryptographic methods, including Quantum Key Distribution (QKD). In a QKD scheme, a cryptographic key is shared between two parties—a transmitter (often referred to as "Alice") and a receiver (often referred to as "Bob"). The encoding and decoding of information is performed using classical cryptographic techniques, over a classical channel, through use of a shared key between Alice and Bob, but the key is distributed over a quantum communication channel that has the property of being secured against eavesdropping by a third party, often referred to as "Eve". In a QKD scheme, Alice will choose two or more bases for encoding of information, where each basis includes a plurality of mutually orthogonal states forming that basis. The bases are selected to be mutually unbiased—thus, if the basis used for measurement of an encoded bit is the same as the basis used to encode the encoded bit, the original state can be measured accurately, but if the measuring basis is different to the encoding basis, the measurement will randomly output a state in the measuring basis. Due to quantum mechanical properties of the photon, it is not possible for Eve to measure and re-transmit the photon without permanently affecting the state of the photon and alerting Alice and Bob to her presence.

BRIEF DESCRIPTION OF THE FIGURES

Embodiments of the invention will now be described by way of example with reference to the accompanying drawings.

DETAILED DESCRIPTION

Various aspects and embodiments are set out in the appended claims.

In one embodiment, there is provided an optical device comprising: a light routing element coupled to a first optical path and a second optical path such that light received by the light routing element is directed into one of the first optical path or the second optical path; a combiner coupling the first optical path and second optical path into a single output path; a controller applying a control signal to said light routing element, the control signal indicating whether a portion of the light received by the light routing element is directed into the first optical path or into the second optical path; a phase controlling element provided in the first optical path such that there is provided a pre-determined fixed phase difference between a light pulse routed through the first optical path and a light pulse routed through the second optical path.

The disclosed system addresses a technical problem tied to encoding quantum states, such as those used for QKD. Namely, system addresses the technical problem of encoding quantum states with minimised phase instability and drift, thereby improving Quantum Bit Error Rate (QBER) and providing a higher secret key rate (SKR).

Multiple encoding schemes can be used for QKD. One example is polarization encoding, where the chosen bases are the rectilinear polarization basis and the diagonal polarization basis. A second example is time-bin encoding, where a quantum state is encoded by preparing a pair of coherent pulses separated into "time bins" that are separated by a time delay sufficient to distinguish the pulses from one another.

In the time-bin encoded scheme, the two pulses can be represented by an early pulse $|e\rangle$ in the early time bin and representing a $|0\rangle$ state, and a late pulse $|l\rangle$ in a late time bin and representing a $|1\rangle$ state. A quantum state can be constructed by a combination of an early pulse and late pulse. The early pulse and late pulse have a phase relation $\phi$ between them. A different state is represented by a different phase—e.g. for an i-th state: $|\psi_i\rangle = e^{i\Phi_i}|e\rangle + |l\rangle$. Phases can be chosen to construct bases for QKD, such as a minority basis $\{0, \pi\}$ of states:

$$|\psi_1\rangle = |e\rangle + |l\rangle$$

$$|\psi_2\rangle = |e\rangle - |l\rangle$$

and a majority basis $$\left\{\frac{\pi}{2}, \frac{3\pi}{2}\right\}$$

of states:

$$|\psi_3\rangle = e^{\frac{i\pi}{2}}|e\rangle + |l\rangle$$

$$|\psi_4\rangle = e^{\frac{3i\pi}{2}}|e\rangle + |l\rangle$$

Time-bin states can be generated by producing single photon pulses and splitting each photon pulse through an optical beam splitter such as an Asymmetric Mach-Zehnder Interferometer (AMZI). Each of the split pulses are directed down different arms, where each arm has a different path length, before being recombined. The different path lengths introduce a time-delay between the pulses corresponding to the time bin separation. The time delay is not enough to result in decoherence, but is enough to distinguish the pulses. For example, the time difference may be on the order of 500 ps, or 1 nanosecond.

The optical devices described herein provide a way to encode a phase shift ϕ between the two time bin pulses through use of a further interferometer featuring a phase controlling element in one optical path to provide a phase delay. Thus, the different encoded states can be produced by selecting which of the early and late pulses is to be directed into the path with the phase controlling element. For example, the phase delay can be introduced by a passive phase controlling element, or introduced by an active phase controlling element such as a phase modulator. A light routing element is used to selectively direct the early or late pulse in the different optical paths.

This means that many encoded states can be generated through the use of single phase controlling element providing a single, fixed-phase difference. The optical device therefore does not need a high speed phase modulator that is switchable between multiple levels to encode multiple states. The optical device also does not need multiple switchable phase modulators to achieve the same effect. By minimising switching of phase levels and minimising required component parts, the optical device is less complex, less expensive and less power intensive. The optical device is also therefore less vulnerable to phase instabilities or drift, which might result from continually switching phase modulator states. The optical device therefore reduces the QBER and provides a higher SKR.

In one embodiment, the light routing element is switchable between a first routing state and a second routing state in response to the control signal, wherein in the first routing state the light routing element directs a received light pulse into the first optical path and in the second routing state the light routing element directs a received light pulse into the second optical path.

In one embodiment, the control signal indicates an encoded state for a pair of successive coherent pulses having a first pulse and a second pulse, wherein: the light routing element is configured to switch from the first routing state that directs the first pulse into the first optical path to a second state that directs the second pulse into the second optical path, in response to the control signal indicating a first encoded state; the light routing element is configured to switch from the second routing state that directs the first pulse into the second optical path to the first routing state that directs the second pulse into the first optical path, in response to the control signal indicating a second encoded state.

In one embodiment, the pre-determined fixed phase difference is such that the first encoded state and second encoded state are orthogonal states of a first basis.

In one embodiment, the light routing element is configured to maintain the first routing state to route both the first pulse and the second pulse through first optical path, or to maintain the second routing state to route the first pulse and the second pulse through the second optical path, in response to the control signal indicating a third encoded state; wherein the third encoded state is a state in a second basis, the first basis and second basis being conjugate bases.

In one embodiment, the optical device further comprises a first light guiding element defining at least a portion of the first optical path and a second light guiding element defining at least a portion of the second optical path.

In one embodiment, the fixed phase difference is provided by at least a portion of the first light guiding element having a different light propagation constant to at least a portion of the second light guiding element.

In one embodiment, the fixed phase difference is provided by at least a portion of the first light guiding element having a different length to at least a portion of the second light guiding element.

In one embodiment, the different light propagation constants are provided by the at least a portion of the first light guiding element and the at least a portion of the second light guiding element having at least one of: a different refractive index; a different geometric profile; and a different chemical composition.

In one embodiment, the phase controlling element is an active phase controlling element, the phase controlling element including at least one of: a thermo-optic element, a mems element, a piezo-electric component, a carrier injection phase modulator, a carrier depletion phase modulator, or an electro-optic phase modulator.

In one embodiment, the phase controlling element is a first phase controlling element and wherein the optical device further comprises a second phase controlling element provided in the second optical path.

In one embodiment, the light routing element is coupled to one or more additional optical paths, the combiner additionally coupling the one or more additional optical paths into the single output path; wherein the control signal further indicates whether a light pulse received by the light routing element is directed into the first optical path, the second optical path or any one of the one or more additional optical paths; and wherein each path of the one or more additional optical paths is provided with a phase modulator such that there is provided a pre-determined fixed phase difference between a light pulse passed through the first optical path and any one of the one or more additional optical paths, or between a light pulse passed through the second optical path and any one of the one or more additional optical paths.

In one embodiment, the optical device further comprises a light source producing light pulses to be received by the light routing element.

In one embodiment, the light source comprises one or more of: a laser, an optical filter, an intensity modulator and a time delay interferometer.

In one embodiment, the light source produces light pulses with a mean photon number of <1.

In one embodiment, the optical device further comprises one or more input light intensity controlling elements controlling the intensity of light received by the light routing element.

In one embodiment, the optical device further comprising one or more output light intensity controlling elements controlling the light intensity of the output of the first optical path and/or the light intensity of the output of the second optical path.

In one embodiment, the optical device further comprises a photonic chip and wherein the optical device is implemented on the photonic chip.

In one embodiment, there is described a quantum communication system comprising an optical device as set out above and an optical receiver receiving an output from the single output path and measuring the output in one or more bases.

In one embodiment, there is described a method of encoding a quantum state comprising the steps of: receiving a pair of coherent light pulses from a light source; receiving a control signal; in response to the control signal, routing a first pulse of the pair of light pulses into a first optical path or a second optical path and routing a second pulse of the pair of light pulses into the first optical path or the second optical path, wherein a phase controlling element is provided in the first optical path such that there is provided a pre-determined fixed phase difference between a light pulse passed through the first optical path and a light pulse passing through the second optical path; combining the outputs of the at least two paths into a single output path.

Figure 1:
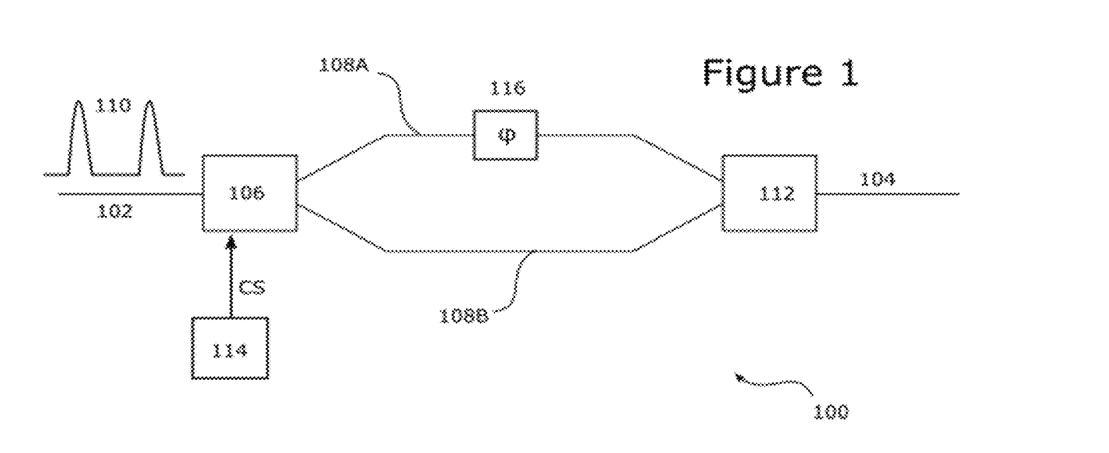
FIG. 1 is a schematic of a quantum state encoder in accordance with one embodiment.

FIG. 1 is a schematic illustrating an optical device 100. The optical device 100 comprises an input 102 configured to receive light (such as a light pulse 110) from a light source. The optical device 100 also comprises a single output path 104 configured to output an encoded quantum state.

The optical device 100 comprises a light routing element 106 coupled to a first optical path 108A and a second optical path 108B such that light (such as light pulse 110) received by the light routing element 106 is directed into one of the first optical path 108A or the second optical path 108B. Each optical path may include free space optical paths or optical paths comprising a wave guiding component. The wave guiding component may be implemented off-chip. For example, the optical path comprises an off-chip optical fiber or off-chip polymer waveguide that forms at least part of or the entire optical path. Alternatively, the wave guiding components may be on-chip photonic waveguides. On-chip optical waveguides may be optical waveguides including planar (2-D) waveguides or non-planar (3-D) wave guides. The waveguides may be formed using semiconductor materials such as Indium Phosphide, or may be silicon-on-insulator waveguides, glass waveguides, electro-optic waveguides or hollow waveguides. Waveguide geometries that may be used include buried waveguides, diffused waveguides, ridge/wire waveguides, strip-loaded waveguides, ARROW waveguides, rib wave guides and slot waveguides.

The optical device 100 further comprises a combiner 112 coupling the first optical path 108A and second optical path 108B into the single output path 104. The single output path 104 may be coupled to a communication channel for transmission of the light output into the single output path 104. The optical device 100 further comprises a controller 114 applying a control signal CS to said light routing element 106. The control signal CS indicates whether light received by the light routing element 106 is directed into the first optical path 108A or into the second optical path 108B. The light routing element 106 thus acts as a form of optical switch. The light routing element 106 is reconfigurable to selectively transmit received light into a chosen optical path upon receipt of the control signal CS. More detail on how the routing element 106 may be reconfigured to achieve selective redirection of light will be provided below.

Optical device 100 further comprises a phase controlling element 116 provided in the first optical path 108A such that there is provided a pre-determined fixed phase difference between a light pulse routed through the first optical path 108A and a light pulse routed through the second optical path 108B. Thus, when the pulses traversing each path are recombined at the combiner 112, the pulses will form an encoded quantum state.

In an example operation, the optical device 100 receives a pair coherent pulses having a first light pulse and a second light pulse. These pulses are distinguishable through measurable properties of the pulses. Measurable properties can include phase of a light pulse, intensity of a light pulse, and/or polarization of a light pulse. In one embodiment, which will form the basis of the detailed discussion below and the accompanying figures, pulses are separated into time bins in a time-bin encoded scheme. In this case, each pulse will arrive successively at the optical device, separated by a time delay $\Delta t$. In this example, the first pulse is referred to as an "early pulse", denoted $|e\rangle$. The second pulse is referred to as a "late pulse", denoted $|l\rangle$. However, it will be understood that other measurable properties can be used to characterise light pulses may be used with the system. For example, light pulses with different polarizations of photons.

The early pulse and late pulse are produced through an optical process and apparatus, which will be described in more detail below. The early pulse and late together form an initial state $|\psi_{int}\rangle = |e\rangle + |l\rangle$ provided to the input 102 of the optical device. The early pulse and late pulse may be generated with a small phase offset $\delta$ between them, such that $|\psi_{int}\rangle = |e\rangle + e^{i\delta}|l\rangle$. However, when this offset exists, it is propagated through the encoding of the pulses, and is compensated for during measurement at the detector. As such, even if an offset exists, the encoder will still introduce the same fixed phase difference between the early and late pulses to generate encoded states for use in a QKD protocol and will not affect the state measurement at the optical receiver. In the encoding processes described below this offset is therefore disregarded, and the initial state is taken as $|\psi_{int}\rangle = |e\rangle + |l\rangle$. Each of the early and late pulses received by the light routing element 106 are routed to a different optical path based on the configuration of the light routing element 106. In one implementation, the light routing element 106 is switchable between a first routing state and a second routing state in response to the control signal CS. In the first routing state the light routing element 106 directs a received light pulse 110 into the first optical path 108A. In the second routing state the light routing element directs a received light pulse 110 into the second optical path 108B. Thus, the light routing element 106 acts as an active optical switch. The light routing element 106 is reconfigurable to a chosen routing state based on the desired final encoded state. In one example, the control signal CS is a time-varying signal that switches between different signal states at regular periods of time. The different signal states of the control signal CS are separated in time by an amount that corresponds to the time separation between input pulses. Each signal state controls the light routing element 106 to switch between light routing states in step with the received light pulses. The pattern of signal states is chosen based on the desired final encoded output states.

In an embodiment, the light routing element 106 comprises an optical switch. In an embodiment, the optical switch may be a Radio Frequency Mach Zehnder Modulator (RF-MZM) switch. For example, the optical switch is a push-pull MZM with identical phase modulators in each arm, driven by opposite voltages. The control signal CS is provided to each of the phase modulators to switch which output of the RF-MZM outputs the signal. The provision of opposing voltages to identical phase modulators in each arm results in an equivalent phase adjustment to the provision of a single phase modulator being driven at a higher voltage. Since smaller voltages are provided to modulate the phase in each phase modulator, phase instabilities and artefacts can be minimised, resulting in a higher quality optical switch. Any active phase controlling element may be provided for the identical phase modulators in each arm of the optical switch. For example, the phase modulators may each include a thermo-optic element, a microelectromechanical system (MEMS) element, a piezo-electric component, a carrier injection phase modulator, a carrier depletion phase modulator, or an electro-optic phase modulator.

Alternatively, the optical switch may be a microelectromechanical system (MEMS) switch. A MEMS switch is configured to redirect light by mechanically actuating an optical path in response to the control signal CS.

The switching speed of the light routing element 106 is selected to discriminate between the time bin pulses, such as a switching speed of at least 1/(separation of time bin pulses). For example, if the time bin pulses are separated by 500 ps, the switching speed is at least 2 GHz.

The controller 114 may be any computer processing element that is configured to process data and provide signals to the light routing element 106. In one embodiment, the control signal CS is a voltage signal that switches between a high level and a low level. The high voltage level and low voltage level respectively switch of the light routine element 106 between routing states. The controller 114 is thus configured to provide the variations in voltage in synchronisation with the time-bin separation of the input pulses.

It will be understood that the above described light routing element 106 comprises an optical switch configured to selectively route time-bin encoded pulses. In another embodiment, the optical switch is configured to selectively route light that is to be encoded by polarization. In this embodiment, the light routing element 106 comprises an optical switch selected from a switchable polarization beam splitter. The switchable polarization beamsplitter is configured to split input light into two output paths. The switchable polarization beamsplitter is configured to switch output paths of the polarized beams in response to the control signal CS.

The application of the above-described optical device 100 shown in FIG. 1 will now be described for the time-bin encoding scheme. Production of a final encoded state will be described below in reference to FIGS. 2A-2C. In this implementation, the control signal CS indicates a final encoded state $|\psi_{enc}\rangle$ for a pair of successive coherent pulses having a first pulse 220A and a second pulse 220B. The first and second pulses are the early and late pulses of the initial state $|\psi_{int}\rangle$ as described above.

Figure 2A:
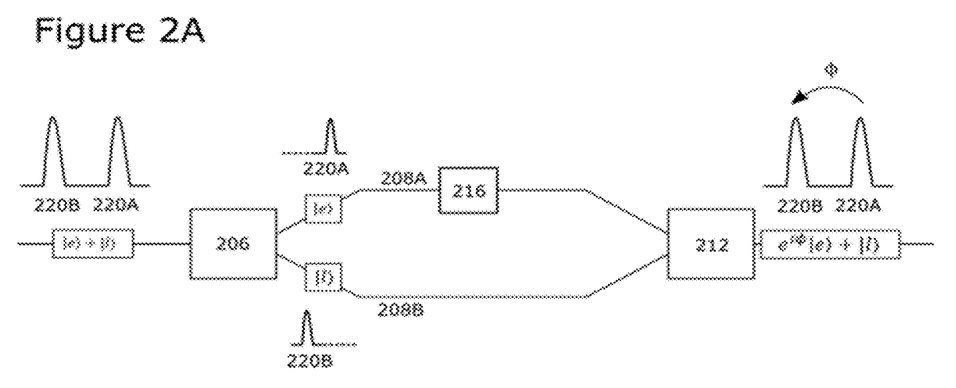
FIG. 2A is a schematic illustrating the encoding of a first state using the quantum state encoder of FIG. 1.

The encoding of a first state is shown by reference to FIG. 2A. Prior to receiving the first pulse 220A, the light routing element 206 is in the first routing state. Upon receiving the first pulse 220A, the light routing element 206 will direct the first pulse 220A into the first optical path 208A. The light routing element 206 may be placed in the first routing state in response to the control signal CS. The light routing element 206 is configured to switch from the first routing state that directs the first pulse 220A into the first optical path 208A to the second routing state that directs the second pulse 220B into the second optical path 208B. The switching from the first routing state to the second routing state is in response to the control signal CS indicating a first encoded state. The switching takes place after receiving the first pulse 220A but before receiving the second pulse 220B. The second pulse 220B is then routed into the second optical path 208B.

The phase controlling element 216 will receive and shift the first light pulse passing through the first optical path 208A. Thus, when the first pulse 220A and second pulse 220B are combined by combiner 212, a final encoded state is produced such that $|\psi_{end}\rangle = e^{i\phi}|e\rangle + |l\rangle$.

Figure 2B:
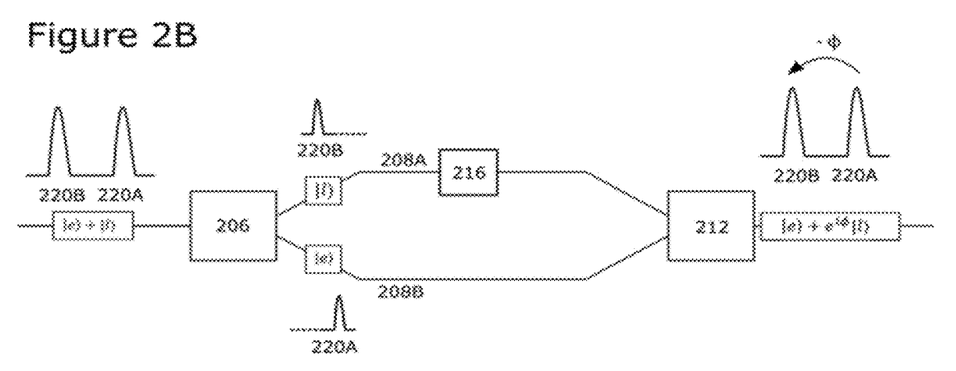
FIG. 2B is a schematic illustrating the encoding of a second state using the quantum state encoder of FIG. 1.

The encoding of a second state is shown by reference to FIG. 2B. Prior to receiving the first pulse 220A, the light routing element 206 is in the second routing state. Upon receiving the first pulse 220A the light routing element 206 will direct the first pulse 220A into the second optical path 208B. The light routing element 206 may be placed in the second routing state in response to the control signal CS. The light routing element 206 is configured to switch from the second routing state that directs the first pulse 220A into the second optical path 208B to the first routing state that directs the second pulse 220B into the first optical path 208A. The switching from the second routing state to the first routing state is in response to the control signal CS indicating a second encoded state. The switching takes place after receiving the first pulse 220A but before receiving the second pulse 220B, such that the second pulse 220B is routed into the first optical path 208B.

The phase controlling element 216 will receive and phase shift the second light pulse passing through the first optical path 208A. Thus, when the first pulse 220A and second pulse 220B are combined by combiner 212, a final encoded state is produced such that $|\psi_{enc}\rangle = |e\rangle + e^{i\phi}|l\rangle$.

Figure 2C:
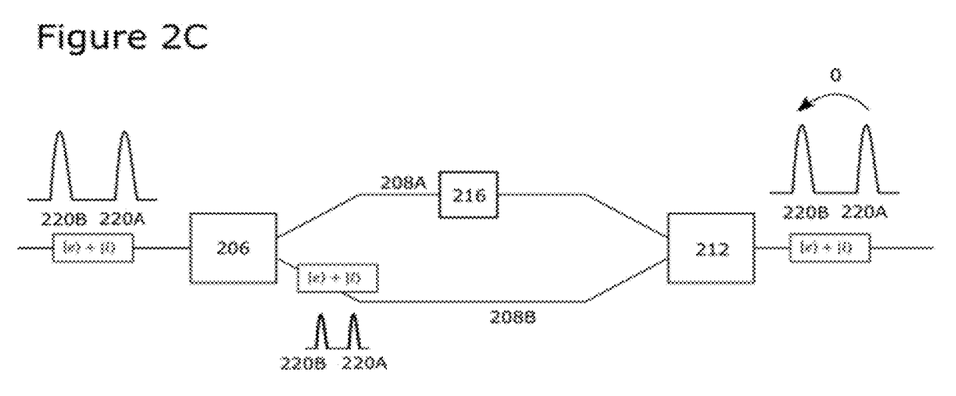
FIG. 2C is a schematic illustrating the encoding of a third state using the quantum state encoder of FIG. 1.

The encoding of a third state is shown by reference to FIG. 2C. Prior to receiving the first pulse 220A, the light routing element 206 is in either the first routing state or the second routing state as an initial routing state. The light routing element 206 may be placed in the initial routing state in response to the control signal CS. The light routing element 206 is configured to maintain the initial routing state in response to the control signal indicating a third encoded state (e.g. the light routing element 206 is configured to maintain the first routing state to route both the first pulse and the second pulse through first optical path 208A. Alternatively, the light routing element 206 is configured to maintain the second routing state to route the first pulse and the second pulse through the second optical path 208B, in response to the control signal indicating the third encoded state). Thus, the first light pulse 220A and the second light pulse 220B are directed into the same optical path. There will be no relative phase shift between the two pulses at the output of the combiner 212. Thus a final encoded state is produced such that $|\psi_{enc}\rangle = e^{i\phi}|e\rangle + e^{i\phi}|l\rangle$ (if both pulses traverse in the first optical path 208A), or $|\psi_{enc}\rangle = |e\rangle + |l\rangle$ (if both pulses traverse in the second optical path 208B).

With the system of FIGS. 2A-2C, three possible states can be encoded through the use of a single fixed phase difference. The phase controlling element 216 therefore does not need to switch between different levels. As such, in one embodiment a passive phase controlling element 216 may be used to provide the fixed phase difference. With the system of FIGS. 2A-2C, Quantum states can be encoded without an active multi-level optical modulator or multiple active individual optical modulators. Repeatedly switching between multiple levels in a phase modulator can cause the phase modulator to drift over time, can cause fluctuations (or patterning) or can cause phase instabilities. The final encoded states using the system of FIG. 2 are therefore generated with reduced patterning, reduced instabilities and reduced drift. As such, the quantum states generated using the disclosed system and method have a lower QBER and a higher SKR as compared to existing systems.

The optical device of FIGS. 1 and 2 can apply any fixed phase difference between the two optical paths to generate desired optical states. In one embodiment, the fixed phase difference is selected to encode states for use in a QKD scheme.

In one embodiment the optical device of FIGS. 1 and 2 acts as an encoder, and is used to implement a method of encoding a quantum state comprising the steps of: receiving a pair of coherent light pulses from a light source; receiving a control signal; in response to the control signal, routing a first pulse of the pair of light pulses into a first optical path or a second optical path and routing a second pulse of the pair of light pulses into the first optical path or the second optical path, wherein a phase controlling element is provided in the first optical path such that there is provided a pre-determined fixed phase difference between a light pulse passed through the first optical path and a light pulse passing through the second optical path; combining the outputs of the at least two paths into a single output path.

As previously explained, several discrete variable QKD schemes use two bases that are mutually unbiased, with each basis comprising two mutually orthogonal states. In general, at least three states are required—two states in a first of the two bases and at least one in the second of the two bases. Thus, in one embodiment for use in QKD the pre-determined fixed phase difference $\Delta\phi$ is such that the first encoded state and second encoded state are orthogonal states of a first basis, and the third encoded state is a state in a second basis, wherein the first basis and second basis are mutually unbiased bases.

In one embodiment, the relative phase shift is chosen as $$\Delta\phi = \frac{\pi}{2},$$

to produce the three encoded states of:

$$|\chi_1\rangle = e^{\frac{i\pi}{2}}|e\rangle + |l\rangle$$

$$|\chi_2\rangle = |e\rangle + e^{\frac{i\pi}{2}}|l\rangle = e^{\frac{i\pi}{2}}(e^{\frac{3i\pi}{2}}|e\rangle + |l\rangle)$$

$$|\chi_3\rangle = |e\rangle + |l\rangle \text{ or } |\psi_3\rangle = e^{\frac{i\pi}{2}}(|e\rangle + |l\rangle)$$

States $|\chi_1\rangle$ and $|\chi_2\rangle$ correspond to states in the majority $$\left\{\frac{\pi}{2}, \frac{3\pi}{2}\right\}$$

basis as described above. $|\chi_3\rangle$ corresponds to the 0 phase state in the minority $\{0, \pi\}$ basis as described above. These three states can thus be employed in a QKD protocol, such as the 3-state BB84 protocol. Under this scheme, the states $|\chi_1\rangle$ and $|\chi_2\rangle$ are encoded with a global phase rotation of $$\frac{\pi}{2}$$

between them, but will not affect the measurement of the encoded state.

In another embodiment, the relative phase shift is chosen as $\Delta\phi=\pi$. In this embodiment, a series of coherent pulses is sent through the encoder. Consecutive light pulses directed into the same path will be output with zero phase difference between them, whereas consecutive pulses directed into different paths will be output with a relative phase of $\pm\pi$ between them. If the receiver is aligned to decode states of the $\{0, \pi\}$ basis, then the measurement result is independent on the sign of the relative $\pi$ phase. Thus, two states may be generated:

$$|\Gamma_1\rangle = e^{\pm i\pi}|e\rangle + |l\rangle$$

$$|\Gamma_2\rangle = |e\rangle + |l\rangle$$

States $|\Gamma_1\rangle$ and $|\Gamma_2\rangle$ correspond to the $\pi$ and 0 phase states in the $\{0, \pi\}$ basis as described above. These two states can thus be employed in the Differential Phase Shift (DPS) QKD protocol.

An exemplary operation of the light routing element in response to the control signal CS will now be described in connection with FIG. 3. The light source is configured to produce a series of light pulses P that include multiple pulse pairs. For example, pair P11 and P12, pair P21 and P22, pair P31 and P32, pair P41 and P42 and pair P51 and P52 each having two pulses separated by the time-bin separation time $\Delta t$.

The control signal CS is provided to the light routing element 106 as one of two levels—a positive signal $+V$ or a negative signal $-V$. In one embodiment, this signal is in the form of a voltage. An example positive signal is $+4V$ and an example negative signal is $-4V$. When the $+V$ signal is provided by the controller 114, the light routing element 106 is placed in the second routing state. When the $-V$ signal is provided by the controller 114, the light routing element 106 is placed in the first routing state. It will be understood that the control signal CS may comprise more than two levels, for example when switching between more than two paths in an apparatus to be described in more detail below.

Figure 3:
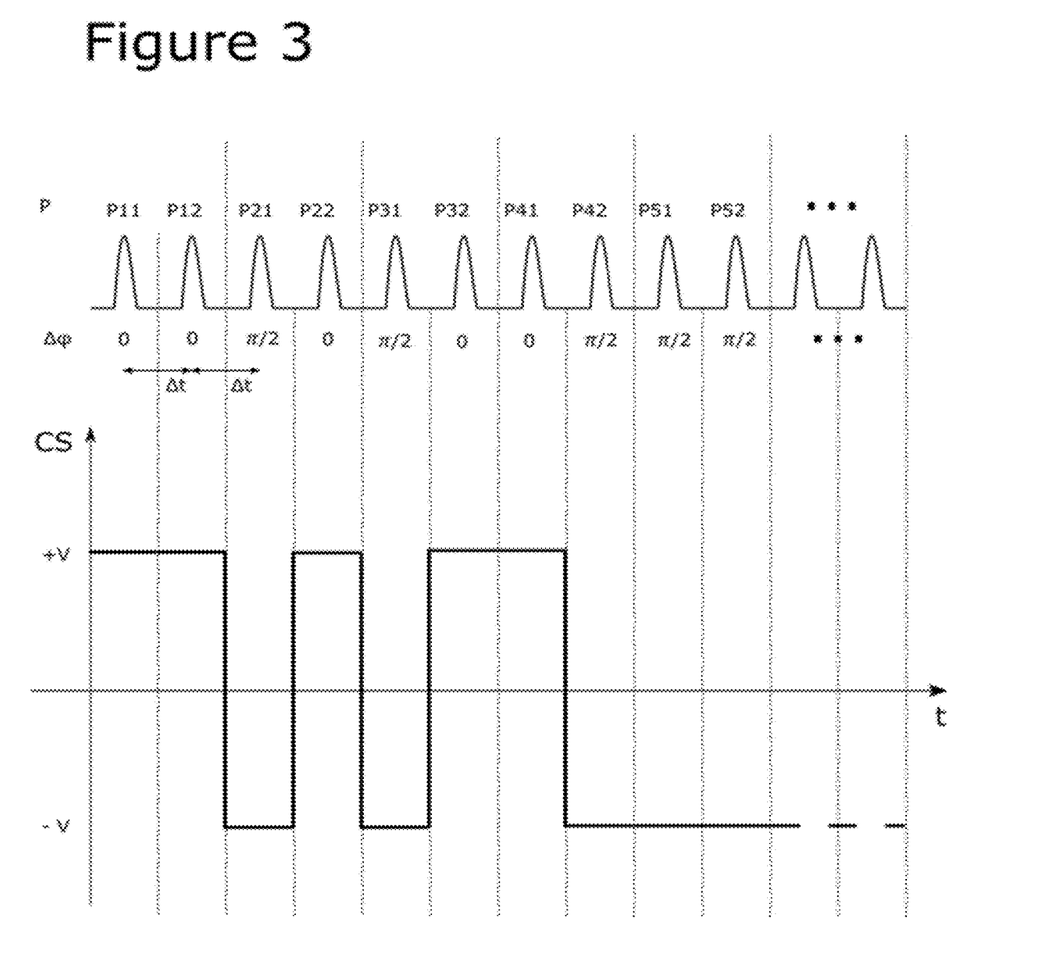
FIG. 3 is a time-voltage diagram illustrating the application of a control signal to a light routing element to encode the first, second and third states of FIGS. 2A-2C.

As illustrated in FIG. 3, the control signal is a time-varying signal configured to switch the light routing element 106 in time with the time separation of the received light pulses. When the control signal is maintained at the same level $+V$ for a first pulse and a second pulse (for example, pulse pair P11 and P12), the two pulses are directed into the same path. Each pulse is provided with a $\Delta\phi=0$ phase modulation. The first pulse and second pulse therefore have zero phase difference between them. These first and second pulses therefore combine to form an encoded state corresponding to the 0-phase state of the $\{0, \pi\}$ basis. When the control signal switches from $-V$ to $+V$ between a first pulse and a second pulse (for example, pulse pair P21 and P22 or pulse pair P31 and P32), the pulses are directed into different paths. In the example where the phase controlling element is configured to provide a $$\frac{\pi}{2}$$

phase shift, the first pulse is modulated with a $$\Delta\varphi = \frac{\pi}{2}$$

phase modulation and the second pulse is modulated with a $\Delta\varphi=0$ phase modulation. These first and second pulses therefore combine to form an encoded state corresponding to the $$\frac{\pi}{2}$$

phase state of the $$\left\{\frac{\pi}{2}, \frac{3\pi}{2}\right\}$$

basis. By way of further example, FIG. 3 illustrate additional example pulse pair P41 and P42 encoded into a phase state of the $\frac{3\pi}{2}$ $\left\{\frac{\pi}{2},\frac{3\pi}{2}\right\}$ basis and example pulse pair P51 and P52 encoded into the 0-phase state of the {0, π} basis.

Thus, from a series of input light pulses, the optical device can generate a series of encoded quantum states at the output of the optical device.

The optical paths of the above described embodiment each comprise a light propagating medium. In one embodiment, the paths are formed in free-space. In one embodiment, the optical device 100 further comprises a first light guiding element defining at least a portion of the first optical path 108A and a second light guiding element defining at least a portion of the second optical path 108B. Providing the optical paths in light guiding elements minimises propagation losses. In one embodiment, the light guiding elements are selected from optical fibres or polymer waveguides. In another embodiment, the light guiding elements are selected from photonic waveguides integrated on photonic circuits, including the example on-chip waveguide materials and on-chip waveguide geometries discussed above.

The above embodiments have been described by reference to a phase controlling element 116 providing a fixed phase difference. This phase controlling element 116 may be a passive phase controlling element, and functions to provide a phase delay to light propagating in the first optical path without being actively controlled by an external signal such as a voltage. Passive phase controlling elements provide higher stability and reduced artefacts in the phase-shifted signal as compared to active phase controlling elements.

In an embodiment, the fixed phase difference is passively provided by at least a portion of the first light guiding element having a different light propagation constant to at least a portion of the second light guiding element. The different light propagation constants may be provided by the at least a portion of the first light guiding element and the at least a portion of the second light guiding element having different characteristics. These different characteristics can include at least one of: a different refractive index; a different geometric profile; and a different chemical composition.

For example, the different refractive index can be provided through the light guiding elements being formed of different materials. In particular, an index difference between two regions is used to confine light in a light guiding region. The two regions could be semiconductor material and air, or two different doping of the same semiconductor, or two different materials etc. Example materials include Silicon (3.5), Silicon Nitride (1.7) Indium Phosphide (3.5), Gallium Arsenide (3) and Glass (1.5), where the number in parentheses is the approximate refractive index for each material at telecommunications wavelengths (having frequencies of approx. 192 THz). The different refractive index may also be provided through use of photonic crystals with line defects that provide an optical channel for propagation of light, with different propagation constants formed through different photonic crystal materials. Alternatively, meta materials may be used as a waveguide.

The geometric profile of different light guiding elements includes the cross-section of the light guiding element. A variation in the cross-sectional areas of light guiding elements results in variation in the effective refractive index of light being propagated through the waveguide. For example, a light guiding element may be a 2-D/planar light guiding element include a planar layer of a light propagating material. The core is layered between cladding and/or air having a different refractive index to the core to provide optical confinement in one transverse direction. As a further example, the light guiding element may be a 3-D light guiding element where the core is non-planar and is surrounded by cladding and/or air having a different refractive index to provide optical confinement in all transverse directions. The transverse cross-sectional area in the core may be varied to modify the effective refractive index for light modes propagating within the light guide, and may be modified to provide different refractive indices for different axes in the transverse direction. Example core geometries that may be used include the waveguide geometries mentioned above, including buried waveguides, diffused waveguides, ridge/wire waveguides, strip-loaded waveguides, ARROW waveguides, rib wave guides and slot waveguides. In the example where metamaterials are used, different propagation constants may be formed in different areas of the meta-surfaces.

The phase controlling element can introduce a phase delay passively by including different overall path lengths of each optical path. If a first path is made slightly longer than a second path by an amount ΔL, light traversing the first path will be delayed relative to the second path will be delayed by an amount Δt=ΔL*n/c, where c is the speed of light and n is the refractive index. This results in a phase shift of ΔΦ=ωΔL*n/c for a light pulse having angular velocity ω. For wavelengths employed in telecoms (approx. 192 THz), only a very small path length is required, given by ΔL=ΔΦ*c/(ω*n)=ΔΦ*λ/(2π*n). For example, for light guiding element formed of Silicon or InP, with a refractive index of approx. 3.5, ΔL=110 nm will provide a π/2 phase shift. For a light guiding element provided in a vacuum (with n=1), ΔL=390 nm will provide a π/2 phase shift.

As an alternative example, a different chemical composition may be obtained by varying the doping concentration of light propagating material in each optical path which will, in turn, affect the refractive index of each optical path differently. For example, waveguides may be employed in each optical path using InP as the substrate and $In_{1-x}Ga_x As_y P_{1-y}$ as the core, where each optical path uses a waveguide with a different Arsenic concentration y in the core to provide different refractive indices in each optical path. Similarly, mixtures of II-V semiconductors can be used (including GaAs/AlGaAs, InGaAs/AlInGaAs or GaN/AlGaN), or waveguides formed of Silicon, Silicon Nitride or Silicon Oxinitride doped with Germanium.

In one embodiment, the phase controlling element 116 comprises an active phase controlling element. The active phase controlling element may comprise a thermo-optic element, in which a resistive material is deposited on or in proximity of the waveguide that will provide heat to the waveguide to adjust its refractive index. Alternatively, or in addition, the phase controlling element comprises a piezo-electric component, in which a piezo material is provided to apply strains to the waveguide to affect the refractive index. Alternatively, or in addition, the phase controlling element comprises a MEMS element, a carrier injection phase modulator, a carrier depletion phase modulator, or an electro-optic phase modulator. These specific phase controlling elements are exemplary only, and the relative phase can be encoded through other phase modulating elements. For example, the phase modulating element may include a travelling wave electrode in which an electric field is applied across a PN junction to create a propagating index variation. If the optical and electrical waves propagate at similar speed, it is possible to reach high modulation frequencies. In a further example, the phase modulating element may include using inter-digitated electrodes on piezo materials to create mechanical vibrations in the form of surface acoustic waves that provide refractive index variation.

In a further example, the phase controlling element 116 may include 2D-materials and materials deposited by atomic layer deposition, such as graphene. The 2-D materials are provided on top of waveguides and used to passively shift the phase at high speed.

In one embodiment where a phase tuning element is used, the characteristics of the two optical paths are identical. Thus, the phase difference $\Delta\phi$ is produced by the action of the phase tuning element alone. As an alternative, a phase tuning element may be provided in combination with the above examples where the different optical paths have different characteristics. The phase modulation from the phase tuning element and the phase modulation from the different characteristics combine to produce a selected fixed phase difference.

In one embodiment, the above-described phase controlling element is a first phase controlling element and wherein the optical device further comprises a second phase controlling element provided in the second optical path. The second phase controlling element may also be a passive phase controlling element providing passive phase shifting as described above in connection with the first phase controlling element, or may be an active phase controlling element comprising at least one of: a thermo-optic element, a MEMS element, a piezo-electric component, a carrier injection phase modulator, a carrier depletion phase modulator, or an electro-optic phase modulator, as described above in connection with the first phase controlling element. In this manner the two phase controlling elements are configured to impart the desired phase difference—for example, having one phase tuning element impart a $$-\frac{\pi}{4}$$

phase and another imparting a $$+\frac{\pi}{4}$$

phase (thereby combining to a $$\frac{\pi}{2}$$

phase difference).

In one embodiment, any phase controlling element used in the optical device 100 may be an active phase controlling element that can be actively controlled to impart a time-varying phase difference. For example, a phase controlling element can be configured to impart a phase difference of $$\frac{\pi}{n},$$

wherein n>1. The controller 114 may also be configured to provide a phase control signal to the active phase controlling element to vary n. The variation of n may be in time with the time-bin separated pulses to select a different n value for each pulse. Thus a value for n can be selected encode a desired phase difference between a successive pair of pulses. In this embodiment a wider range of final encoded output states are possible. Although a multi-level phase modulator is used, the multi-level phase modulator is still implemented together with the light routing element 106. The light routing element 106 can selectively route pulses through the multi-level phase modulator. Thus, the described optical device using a multi-level phase modulator can encode multiple states for each value of n selected. Additionally, with an increased number of states available for encoding, the encoder may encode pulses for quantum communication protocols using a higher number of states, including the 4-state and 6-state BB84 protocol and Continuous Variable QKD protocols.

In one embodiment, the optical device 100 comprises a light source producing light pulses to be received by the light routing element 106. In one embodiment, the light source includes a laser. Such a laser may be a gain switched laser configured to produce a series of time-separated pulses with randomized phases between the pulses. Coherent pulse pairs may then be produced by directing each pulse into a time delay interferometer, such as an Asymmetric Mach Zehnder Interferometer (AMZI), to generate a coherent time-separated pair from each input pulse. Thus, each pair of output pulses are phase randomised with respect to other output pulses output from the AMZI.

In an alternative embodiment, the light source comprises a second laser and an optical filter. The second laser operates as a "master laser" (when using conventional terminology), and the first laser is a "slave laser" (when using conventional terminology). The second laser provides a seed to the first laser, meaning that laser pulses output by the first laser have a fixed phase relation. Each output pulse of the first laser can be input into an AMZI as described above to produce coherent pulse pairs. Alternatively, pairs of output pulses from the first laser can be used as the coherent pulse pair for encoding quantum states.

In one embodiment, the second laser is moderated by a phase controlling element. The seed provided by the second laser is modulated by multi-level signals to introduce a varying phase relation between each the maser laser seed, which will in turn produce varying phase between output pulses of the first laser. This phase modulation may be fixed or random.

As another alternative, the laser may provide be a continuous wave CW laser employed alongside an intensity modulator, where the output of the CW laser is selectively modulated to produce a pulsed laser output.

In one embodiment, the light source is configured to produce light pulses with a mean photon number of <1. Alternatively, the optical device is provided with an attenuator coupled to the output of the combiner to attenuate light pulses at the output of the combiner to have a mean photon number of <1. In these embodiments with a mean photon number <1, the system is adapted for discrete variable quantum communication.

In an alternative embodiment, light pulses are produced with a mean photon number of >1, in which case the system may be adapted for continuous variable quantum communication, or for adapted for use in classical communications.

In one embodiment, the light source is configured to produce a series of light pulses with uniform separation time that is equal to the time bin difference Δt. The series of light pulses comprises a plurality of pulse light pairs to be encoded. An example of the series of light pulses is illustrated by plurality of pulses P in FIG. 3, which shows each pulse having a time separation of Δt from pulses adjacent in time. Any two successive pulses therefore have the same time separation.

In an embodiment, the series of light pulses have a uniform separation, are phase coherent, and the fixed phase difference is π to encode quantum states in the DPS QKD protocol. In this embodiment, any two successive pulses from the series of light pulses may be used to encode a quantum state. If a first pulse of any pulse pair is directed through the first optical path to be provided with a π phase shift, the second pulse can be directed through either the first optical path or the second optical path. If the second pulse is sent through the first optical path, there is no phase difference between the pulses and the pulse pair forms a 0-phase state. If the second pulse is sent through the second optical path, there is a π phase difference between the pulses and the pulse pair forms a π-phase state. If a first pulse of any pulse pair is instead directed through the second optical path to be provided with a 0 phase shift, the second pulse can be directed through either the first optical path or the second optical path. If the second pulse is sent through the first optical path, there is a π phase difference between the pulses and the pulse pair forms a π-phase state. If the second pulse is sent through the second optical path, there is no phase difference between the pulses and the pulse pair forms a 0-phase state. In one implementation, a light pulse is combined with a preceding pulse to form a first quantum state. In addition, the light pulse is combined with a following light pulse to form a second quantum state. Thus, three light pulse can be used to form two quantum states. As a result, more quantum states can be encoded within the pulses and a higher SKR can be achieved.

In one embodiment, the optical device 100 further comprises one or more input light intensity controlling elements controlling the intensity of light received by the light routing element. The input light intensity controlling elements may comprise attenuating elements or amplification elements. The attenuation or amplification elements adjust the intensity of light to balance any different amounts of light attenuation that might occur in the optical paths. For example, the light intensity controlling elements mitigate effects such as absorption and scattering. The light intensity controlling elements therefore correct any misbalance of light pulse intensity in the quantum communication channel. With balanced light pulse intensity, an eavesdropper cannot infer photon properties such as phase from the intensity difference, and thus guess the encoding basis.

In alternative or in addition to the input light intensity controlling element, the optical device may comprise one or more output light intensity controlling elements controlling the light intensity of the output of the first optical path 108A and/or the light intensity of the output of the second optical path 108B. The output light intensity controlling elements may be attenuating elements or amplification elements, and are configured to adjust the intensity of the light traversing the first and second optical paths. In one embodiment, the output light intensity controlling elements can be configured to balance the intensity of the light propagating through the different optical paths to produce the same output intensity.

In an additional or alternative embodiment, the combiner elements described herein may be configured to selectively transmit only a fraction of the light propagated through each optical path. In one embodiment, the combiner is a tuneable MZM that comprises a tuneable attenuator element or a tuneable amplification element in one or both arms of the MZM.

Figure 4:
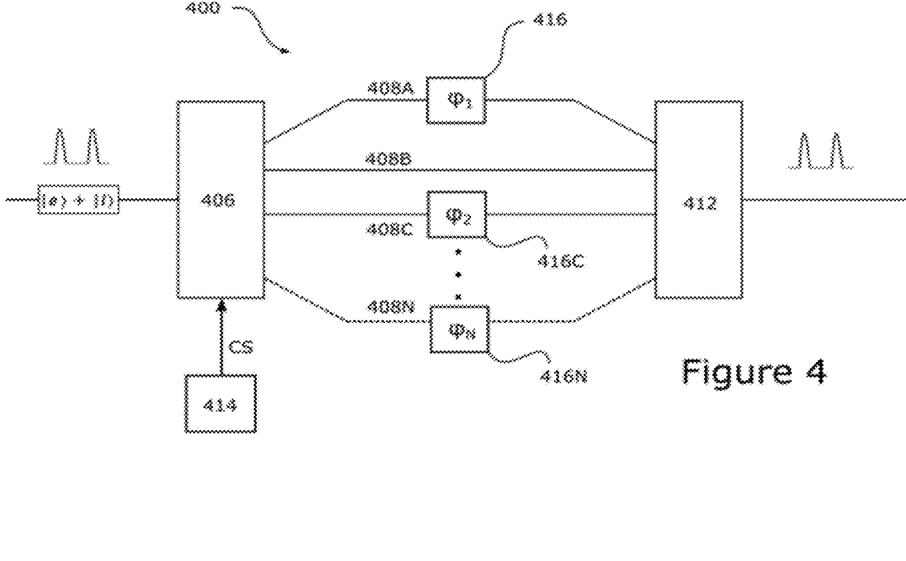
FIG. 4 is a schematic illustrating a further quantum state encoder.

In FIG. 4 there is illustrated a variation of the previously described optical devices. The optical device of FIG. 4 may be used to encode additional quantum states. Optical device 400 of FIG. 4 comprises the features previously described in connection with FIG. 1 and FIG. 2, including a light routing element 406 coupled to a first optical path 408A and a second optical path 408B, a combiner 412 coupling the first optical path 408A and second optical path 408B into a single output path, and a phase controlling element 416 provided in the first optical path 408A. It will be understood that features described above in connection with FIGS. 1 and 2 may also be provided in connection with FIG. 4. Repetition of features previously described will therefore not be repeated.

In addition, in the optical device 400 the light routing element 406 is coupled to one or more additional optical paths 408C . . . 408N, the combiner 412 additionally coupling the one or more additional optical paths 408C . . . 408N into the single output path. The control signal CS further indicates whether a light pulse received by the light routing element is directed into the first optical path 408A, the second optical path 408B or any one of the one or more additional optical paths. In one embodiment, the light routing element 406 comprises a plurality of MZMs connected in a cascaded configuration. In the cascaded configuration a first MZM receives the input light pulses, and one or both outputs of the first MZM is coupled to the input of a separate subsequent MZM. Each subsequent MZM may be coupled to an optical path of the optical device or may be coupled to a further subsequent MZM, where the cascaded MZM configuration comprises a total number of outputs equal to the number of optical paths. The light routing element 406 comprises a subsequent MZM for each of the one or more additional optical paths. The control signal CS comprises signals provided to each MZM of the cascaded MZMs to switch the outputs of each MZM to select a final output of the light routing element 406.

In an alternative embodiment, the light routing element 406 comprises a MEMS optical switch with a plurality of outputs, with the number of outputs corresponding to the number of optical paths in the optical device. In a further alternative embodiment, the light routing element 406 comprises a plurality of MEMS optical switches, with each MEMS optical switch having two outputs and the plurality of MEMS optical switches provided in a cascaded configuration.

Each path of the one or more additional optical paths 408C . . . 408N is provided with a phase controlling element 416C . . . 416N. There may be any number of additional paths, from one additional path up to N additional paths.

The additional phase controlling elements provided in the one or more additional optical paths may take a variety of forms in the same manner as phase controlling element 116 described above. In one embodiment, each phase controlling element is configured to provide a different phase modulation $\varphi_N$. Thus, each path can be configured to provide a different phase shift to a light pulse that traverses that path. In response to the control signal CS, the light routing element 406 can route a light pulse to a specific path of any of the N optical paths. A light pulse traversing the Nth path will undergo a phase modulation $\varphi_N$. Through redirection of each pulse of a pulse pair into an optical path selected from the first optical path 408A, second optical path 408B and the one or more additional optical paths 408C . . . 408N, a wide variety of quantum states may be encoded without the use of active multi-level phase modulators or multiple active phase modulators.

In the above embodiments of FIG. 4, the optical device provides an improvement to quantum state encoding by enabling the encoding of a large number of quantum states through using reduced numbers of optical phase controlling elements. Specifically, for each path and phase controlling element added to the optical device, two additional phases are available for encoding. Reducing the number of optical controlling elements used to encode states reduces patterning, instabilities and drift, as discussed above.

For example, the system may comprise an additional path 408C configured to provide a π phase modulation. In which case, the light routing element 406 may be directed to route the early pulse $|e\rangle$ into the additional path 408C and a late pulse $|l\rangle$ into the second optical path 408B to encode an optical state $|\chi_4\rangle = e^{i\pi}|e\rangle + |l\rangle$, which corresponds to the π phase state of the $\{0, \pi\}$ basis described above. Thus, the system of FIG. 4 using the additional optical path 408C can be used to generate the full four states of the $\{0, \pi\}$ and $$\left\{\frac{\pi}{2}, \frac{3\pi}{2}\right\}$$

bases, making the system an encoder for the 4-state BB84 QKD protocol.

The optical device having three optical paths can be used to encode a total of five possible states, and the optical device having four optical paths can be used to encode seven possible states. In general, when the optical device of FIG. 4 includes a total of N optical paths, and is configured such that each phase controlling element in each optical path provides a different phase shift, the optical device can encode a total of 2N−1 states. Thus, the encoder can be used to encode a number of states required for a Continuous Variable QKD scheme (CV-QKD), which may require two, four, six, eight, sixteen, or more, possible states.

In one embodiment one or more additional optical paths 408C . . . 408N comprise a third optical path and a fourth optical path. The third optical path comprises a phase controlling element configured to modulate received light to impart a fixed phase difference of $$\Delta\phi = \frac{\pi}{2} + \delta$$

and the fourth optical path comprises a phase controlling element to modulate received light to impart a fixed phase difference of $\Delta\phi = \delta$.

Thus, the phase difference between light traversing the third optical path and the light traversing the fourth optical path will be $$\Delta\phi = \frac{\pi}{2}.$$

Figure 5:
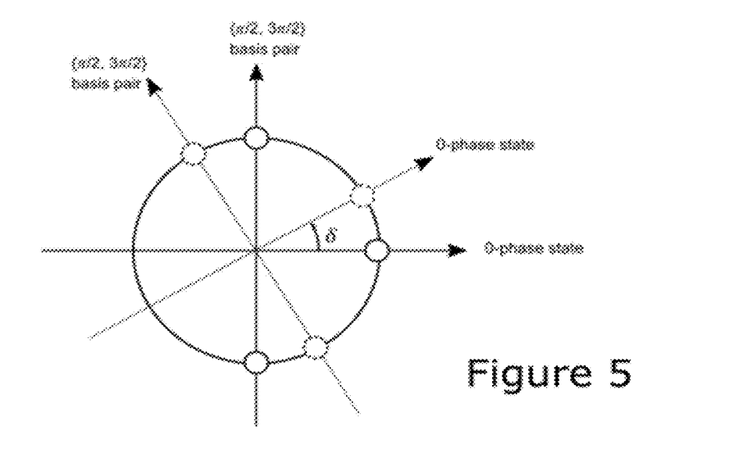
FIG. 5 illustrates a constellation of quantum states that may be encoded using the quantum state encoder of FIG. 4.

The light routing element 406 can selectively direct pulses into the third and fourth optical paths to encode states in the $\{0, \pi\}$ and $$\left\{\frac{\pi}{2}, \frac{3\pi}{2}\right\}$$

bases, in the same manner as by selective routing into the first and second optical paths. However, the final states encoded through the third and fourth optical paths and the final states encoded by the first and second optical paths are separated in phase by an amount δ. A constellation of the final encoded states using this embodiment is illustrated in FIG. 5. Using this embodiment, global-phase shifted final encoded states can be generated from fixed phase input pulses.

It will be understood that with the system of FIG. 4, any number of optical paths may be chosen with different phase modulations to encode any equatorial Bloch state. Thus, the embodiments of FIG. 4 provide improved flexibility in generating quantum states for communication over the quantum channel.

Figure 6:
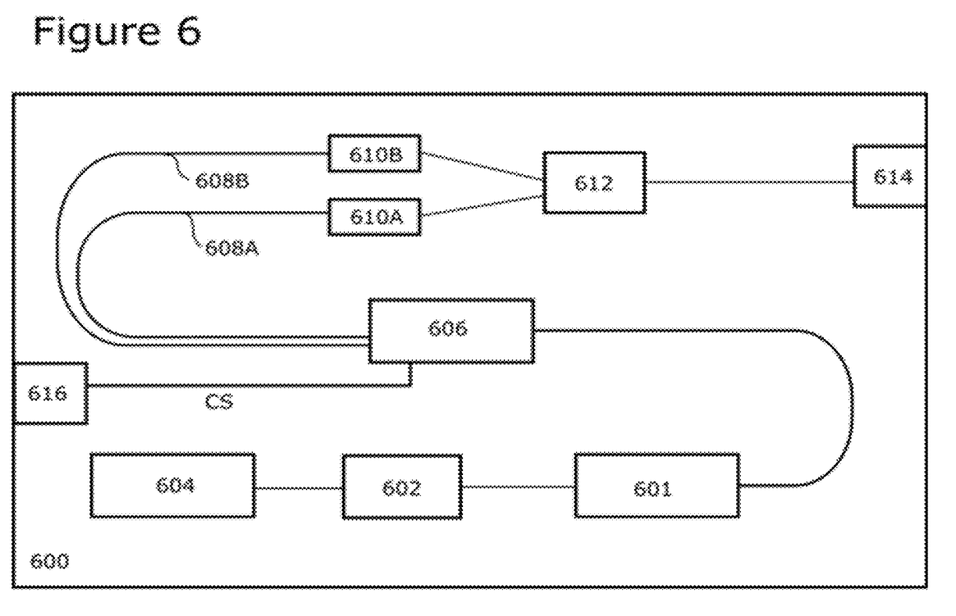
FIG. 6 is a schematic illustration of an optical device formed on a photonic chip.

FIG. 6 illustrates an additional embodiment, in which the above described optical devices comprise a photonic chip 600 and wherein the optical device is implemented on the photonic chip 600. Each component part of the optical devices described above may be implemented as an integrated component of the photonic chip 600. In one embodiment, the photonic chip 600 comprises a first laser 601, optical filter 602, second laser 604, light routing element 606, first optical path 608A, second optical path 608B, first phase controlling element 610A arranged in the first optical path 608A, second phase controlling element 610B arranged in second optical path 608B, combiner 612 and output port 614. In one embodiment, the first and second optical paths are implemented by waveguides integrally formed onto the chip. The first and second optical paths may also comprise the optional light guiding elements as previously described. Additionally, other elements used for propagating light between chip components may also be implemented by waveguides integrally formed onto the chip.

In one embodiment the photonic chip comprises an input port 616. The input port 616 is configured to receive the control signal CS from an external controller. The input port 616 is configured to route the control signal CS to the light routing element 606.

In one embodiment, the input port 616 is also connected to other components on the photonic chip 600 to provide signals to control those components. For example (and not shown in FIG. 6), the input port 616 may be coupled to each of the first laser 601, optical filter 602, first phase controlling element 610A, second phase controlling element 610B and combiner 612.

In an alternative embodiment, the controller is also integrally formed on the photonic chip 600. The integrally formed controller is coupled to the light routing apparatus 606. In one embodiment, the integrally formed controller is connected to other components on the photonic chip 600 to provide signals to control those components. For example, the integrally formed controller is coupled to each of the first laser 601, optical filter 602, first phase controlling element 610A, second phase controlling element 610B and combiner 612. The controller may also be coupled to the input port 616 to receive external signals for modification of controller operation. In one embodiment, the photonic chip is an Indium Phosphide (InP) chip.

The use of photonic chips allows for ease of use, reduced footprint, faster communication and power efficiency. In addition, photonic chips allow for miniaturisation of optical devices and quantum communication systems.

Figure 7:
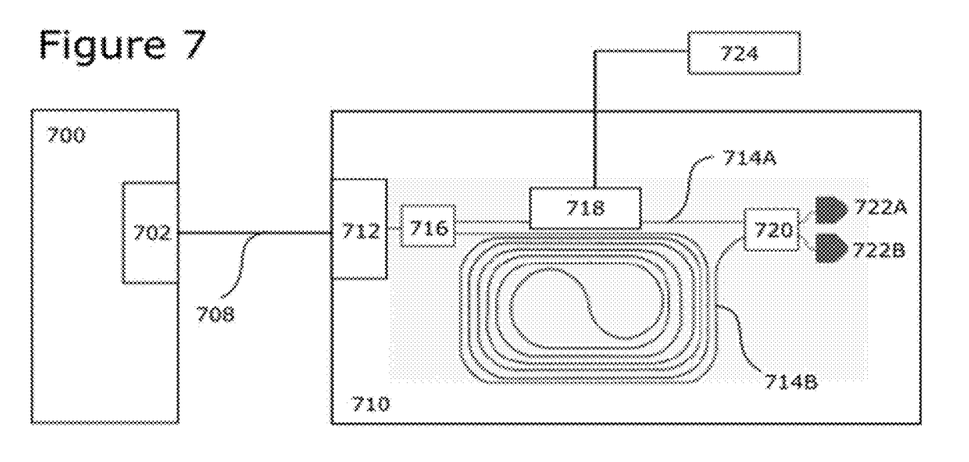
FIG. 7 is a schematic illustration of a quantum communication system, including an optical device acting as an encoder, and an optical receiver.

In one embodiment, the optical device 100 is used as part of a quantum communication system, as illustrated in FIG. 7. The quantum communication system comprises an optical device 700 in accordance with any implementation described herein. The quantum communication system also comprises an optical receiver 710 configured to receive an output from the single output path and configured to measure the received output in one or more bases. The optical device 700 operates as an optical transmitter to send an encoded state from an output 702 over quantum channel 708. The optical device 700 is exemplary of an encoding device utilised by "Alice" and optical receiver 710 is exemplary of a decoding device utilised by "Bob".

Optical receiver 710 comprises a receiver port 712 configured to receive information sent over the quantum channel 708. The receiver port is coupled to a beamsplitter 716 that splits the received encoded state into two receiver optical paths with equal probability. The two receiver optical paths comprise a first receiver optical path 714A and a second receiver optical path 714B. Second receiver path 714B is configured with a longer path length than first receiver optical path 714A. The light traversing the second receiver optical path 714B experiences a time delay that matches the time-bin separation Δt of the time-separated light pulses encoded by the optical device 700. The optical receiver 710 further comprises a combiner 720 that couples the two output receiver paths to a first detector 722A and a second detector 722B.

A light pulse entering the second receiver optical path 714B will experience a delay relative to the encoded state entering the first receiver optical path 714A. Thus, an early pulse that entered the second receiver optical path 714B will be delayed to coincide in time with the late pulse that entered the first receiver optical path 714A. Thus, the outputs of the first and second receiver optical paths are combined by the receiver combiner 720 will be subject to quantum interference.

The interference can be tuned through the use of a receiver phase controlling element 718 present in the first receiver optical path 714A. The receiver phase controlling element 718 modulates the phase of the encoded state passing through the first receiver optical path 714A to provide a measurement phase difference, which is selected to measure in a chosen basis. In one embodiment, the measurement phase difference is selected to be $$\frac{\pi}{2}$$

to measure in the $$\left\{\frac{\pi}{2}, \frac{3\pi}{2}\right\}$$

basis, and the measurement phase difference is selected to be 0 to measure in the {0, π} basis.

As an example, when configured to measure in the {0, π} basis and the encoded state is encoded in a 0 state of the {0, π} basis, the optical detector will register a 1 in detector 722A, and a 0 in detector 722B. When configured to measure in the {0, π} basis and the encoded state is encoded in a $$\frac{\pi}{2}$$

state of the $$\left\{\frac{\pi}{2}, \frac{3\pi}{2}\right\}$$

basis, the detector will measure counts in detector 722A and detector 722B with equal probability. As an additional example, when the detector is configured to measure in the $$\left\{\frac{\pi}{2}, \frac{3\pi}{2}\right\}$$

basis and the encoded state is encoded in a $$\frac{\pi}{2}$$

phase state of the $$\left\{\frac{\pi}{2}, \frac{3\pi}{2}\right\}$$

basis, the optical detector will register a 1 in detector 722A, and a 0 in detector 722B. Similarly, when the detector is configured to measure in the $$\left\{\frac{\pi}{2}, \frac{3\pi}{2}\right\}$$

basis and the encoded state is encoded in a $$\frac{3\pi}{2}$$

phase state of the $$\left\{\frac{\pi}{2}, \frac{3\pi}{2}\right\}$$

basis, the optical detector will register a 0 in detector 722A, and a 1 in detector 722B. When the detector is configured to measure in the $$\left\{\frac{\pi}{2}, \frac{3\pi}{2}\right\}$$

basis and the encoded state is encoded in a 0-phase state of the {0, π} basis, the detector will measure counts in detector 722A and detector 722B with equal probability.

Considering again the situation described above where there is a phase offset between the early and late pulses in the initial state $|\psi_{int}\rangle=|e\rangle+e^{i\delta}|1\rangle$. In this situation the offset is compensated for by an adjustment of the phase shift provided by the measurement phase controlling element 718. For example, if there exists a δ phase offset, and the detector is to be configured to measure in the $$\left\{\frac{\pi}{2}, \frac{3\pi}{2}\right\}$$

basis, the phase controlling element is set to impart a phase shift of $$(\frac{\pi}{2}+\delta).$$

The δ phase offset may be determined from a measurement of calibration pulses sent by the optical device before the pulses containing the quantum key information.

In one embodiment, the optical receiver 710 further comprises one or more light intensity controlling elements to control the intensity of light entering the beamsplitter 716. Additionally, or alternatively, the optical receiver comprises light intensity controlling elements to control the intensity of light entering the combiner 720. The light intensity controlling elements are provided to balance any propagation losses experienced from light traversing the longer optical path 714B. In one embodiment, the beamsplitter 716 and/or combiner 720 are tunable components. For example, the beamsplitter 716 and/or combiner 720 are each a tunable MZI. The tunable components are provided to balance the intensity of light to counter propagation losses from traversing the longer optical path.

Optical receiver 710 may be implemented on a photonic chip, where each component of the optical receiver 710 is implemented as an integrated component on the photonic chip. The receiver controller 724 may also be implemented on the photonic chip. Alternatively, the receiver controller may be implemented in external computer hardware in communication with the photonic chip. In one example, the beamsplitter 716, combiner 720, first receiver optical path 714A, second receiver optical path 714B, and receiver phase controlling element 718 are together embodied by an AMZI. In one embodiment, the photonic chip is an Indium Phosphide (InP) chip.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An optical device comprising:
   a light routing element coupled to a first optical path and a second optical path such that light received by the light routing element is directed into one of the first optical path or the second optical path;
   a combiner coupling the first optical path and second optical path into a single output path;
   a controller applying a control signal to said light routing element, the control signal indicating whether a portion of the light received by the light routing element is directed into the first optical path or into the second optical path; and
   a phase controlling element provided in the first optical path such that there is provided a pre-determined fixed phase difference between a light portion routed through the first optical path and a light portion routed through the second optical path.

2. An optical device according to claim 1, wherein the light routing element is switchable between a first routing state and a second routing state in response to the control signal, wherein in the first routing state the light routing element directs a received light portion into the first optical path and in the second routing state the light routing element directs a received light portion into the second optical path.

3. The optical device according to claim 2, wherein the control signal indicates an encoded state for a pair of successive coherent portions having a first portion and a second portion, wherein:
   the light routing element is configured to switch from the first routing state that directs the first portion into the first optical path to a second state that directs the second portion into the second optical path, in response to the control signal indicating a first encoded state; and
   the light routing element is configured to switch from the second routing state that directs the first portion into the second optical path to the first routing state that directs the second portion into the first optical path, in response to the control signal indicating a second encoded state.

4. An optical device according to claim 3, wherein the pre-determined fixed phase difference is such that the first encoded state and second encoded state are orthogonal states of a first basis.

5. An optical device according to claim 4, wherein the light routing element is configured to maintain the first routing state to route both the first portion and the second portion through first optical path, or to maintain the second routing state to route the first portion and the second portion through the second optical path, in response to the control signal indicating a third encoded state; and
   wherein the third encoded state is a state in a second basis, the first basis and second basis being conjugate bases.

6. The optical device of claim 1, further comprising a first light guiding element defining at least a portion of the first optical path and a second light guiding element defining at least a portion of the second optical path.

7. The optical device of claim 6, wherein the fixed phase difference is provided by at least a portion of the first light guiding element having a different light propagation constant to at least a portion of the second light guiding element.

8. The optical device of claim 7, wherein the different light propagation constants are provided by the at least a portion of the first light guiding element and the at least a portion of the second light guiding element having at least one of: a different refractive index; a different geometric profile; and a different chemical composition.

9. The optical device of claim 1, wherein the phase controlling element is an active phase controlling element, the active phase controlling element including at least one of: a thermo-optic element, a mems element, a piezo-electric component, a carrier injection phase modulator, a carrier depletion phase modulator, or an electro-optic phase modulator.

10. The optical device of claim 1, wherein the phase controlling element is a first phase controlling element and wherein the optical device further comprises a second phase controlling element provided in the second optical path.

11. The optical device of claim 1, wherein the light routing element is coupled to one or more additional optical paths, the combiner additionally coupling the one or more additional optical paths into the single output path;
   wherein the control signal further indicates whether light received by the light routing element is directed into the first optical path, the second optical path or any one of the one or more additional optical paths; and
   wherein each path of the one or more additional optical paths is provided with a phase controlling element.

12. The optical device of claim 1, further comprising a light source producing light to be received by the light routing element.

13. The optical device of claim 12, wherein the light source comprises one or more of: a laser, an optical filter, an intensity modulator and a time delay interferometer.

14. The optical device of claim 12, wherein the light source produces light with a mean photon number of $\ll 1$.

15. The optical device of claim 1, further comprising one or more input light intensity controlling elements controlling the intensity of light received by the light routing element.

16. The optical device of claim 1, further comprising one or more output light intensity controlling elements controlling the light intensity of the output of the first optical path and/or the light intensity of the output of the second optical path.

17. The optical device of claim 1, further comprising a photonic chip and wherein the optical device is implemented on the photonic chip.

18. The device according to claim 1, wherein
   the light routing element is configured to receive coherent portions of light comprising a first portion and a second portion, said light routing element being coupled to the first optical path and the second optical path such that each portion of light is directed into one of either the first optical path or the second optical path; and
   the control signal indicates an encoded state for the first portion and the second portion, and indicating whether each of the first portion and second portion received by the light routing element is directed into the first optical path or into the second optical path.

19. A quantum communication system comprising an optical device and an optical receiver, wherein the optical device comprises:
   a light routing element coupled to a first optical path and a second optical path such that light received by the light routing element is directed into one of the first optical path or the second optical path;
   a combiner coupling the first optical path and second optical path into a single output path;
   a controller applying a control signal to said light routing element, the control signal indicating whether a portion of the light received by the light routing element is directed into the first optical path or into the second optical path; and
   a phase controlling element provided in the first optical path such that there is provided a pre-determined fixed phase difference between a light portion routed through the first optical path and a light portion routed through the second optical path;
   the optical receiver receiving an output from the single output path and measuring the output in one or more bases.

20. The system according to claim 19, wherein
   the light routing element is configured to receive coherent portions of light comprising a first portion and a second portion, said light routing element being coupled to the first optical path and the second optical path such that each portion of light is directed into one of either the first optical path or the second optical path; and
   the control signal indicates an encoded state for the first portion and the second portion, and indicating whether each of the first portion and second portion received by the light routing element is directed into the first optical path or into the second optical path.

21. A method of encoding a quantum state comprising the steps of:
   receiving a pair of light portions from a light source;
   receiving a control signal;
   in response to the control signal, routing a first portion of the pair of light portions into a first optical path or a second optical path and routing a second portion of the pair of light portions into the first optical path or the second optical path, wherein a phase controlling element is provided in the first optical path such that there is provided a pre-determined fixed phase difference between a light portion passed through the first optical path and a light portion passing through the second optical path; and
   combining outputs of the two paths into a single output path.

22. The method according to claim 21, comprising
   receiving coherent portions of light comprising a first portion and a second portion; and
   receiving the control signal indicating an encoded state for the first portion and the second portion.

* * * * *